US 9,568,133 B2

(12) United States Patent
Halkyard et al.

(10) Patent No.: US 9,568,133 B2
(45) Date of Patent: Feb. 14, 2017

(54) LARGE DIAMETER PIPE FLEXIBLE CONNECTION

(71) Applicant: LOCKHEED MARTIN CORPORATION, Bethesda, MD (US)

(72) Inventors: John E. Halkyard, Houston, TX (US); John M. Montague, Houston, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 409 days.

(21) Appl. No.: 13/828,769

(22) Filed: Mar. 14, 2013

(65) Prior Publication Data
US 2014/0265310 A1  Sep. 18, 2014

(51) Int. Cl.
| *F16L 27/111* | (2006.01) |
| *F16L 1/23* | (2006.01) |
| *F16L 27/108* | (2006.01) |
| F16L 27/02 | (2006.01) |
| F03G 7/05 | (2006.01) |
| F16L 27/08 | (2006.01) |
| F16L 1/15 | (2006.01) |
| F16L 27/10 | (2006.01) |

(52) U.S. Cl.
CPC ............ *F16L 27/111* (2013.01); *F16L 1/23* (2013.01); *F16L 27/108* (2013.01); *F16L 27/1085* (2013.01); *F03G 7/05* (2013.01); *F16L 1/15* (2013.01); *F16L 27/02* (2013.01); *F16L 27/0857* (2013.01); *F16L 27/1012* (2013.01)

(58) Field of Classification Search
CPC ...... F16L 1/23; F16L 271/111; F16L 27/1085; F16L 27/108; F16L 27/111; F16L 1/15; F16L 27/1012; F16L 27/0857; F03G 7/05
USPC .................. 285/226, 227, 229, 236
See application file for complete search history.

(56) References Cited

U.S. PATENT DOCUMENTS

| 2,490,513 A | 12/1949 | Dreyer |
| 3,530,566 A * | 9/1970 | Abercrombie et al. ........ 29/447 |
| 3,633,945 A * | 1/1972 | Press et al. .................. 285/226 |
| 4,406,482 A | 9/1983 | Clebant |

(Continued)

FOREIGN PATENT DOCUMENTS

GB  1242536 A  8/1971

OTHER PUBLICATIONS

International Search Report and Written Opinion for International Application No. PCT/US2014/018683, Dated Jun. 17, 2014, 15 pgs.
"FlexJoint Tendon Bearing," http://www.oilstates.com/fw/main/FlexJoint%C2%AE-Tendon-Bearing-380.html, printed 2014 but available as early as Jul. 2010.
Nihous et al., "Design of a 100 MW OTEC-Hydrogen Plantship" Marine Structures, vol. 6, pp. 207-221, 1993.
Author Unknown, "FlexJoint™ Products," oilstates.com/offshore/riser-products/flexjoint-products/, accessed Jun. 3, 2016, Oil States Industries, Inc., pp. 1-3.
Author Unknown, "FlexJoint™ SCR/SLWR Technology," oilstates.com/offshore/floating-production-products/flexjoint-scr-slwr-technology/, accessed Jun. 3, 2016, Oil States Industries, Inc., pp. 1-2.
Author Unknown, "OTEC CWP Analysis," Top Termination Study for 4 m and 10 m Cold Water Pipe—Strength and Fatigue Report, Revision A, Jun. 25, 2010, Houston Offshore Engineering, 27 pages.

(Continued)

*Primary Examiner* — Daniel P Stodola
*Assistant Examiner* — Zachary Dragicevich
(74) *Attorney, Agent, or Firm* — Withrow & Terranova, PLLC

(57) ABSTRACT

A flexible connection for use between a vertical, large diameter cold water conveying pipe and a floating platform that supports the cold water conveying pipe or another pipe to permit the pipe and the platform to rotate in roll and pitch directions relative to one another without imposing excessive bending moments or strain on the cold water pipe. The flexible connection also contains internal and external pressure across the connection. The flexible connection includes an articulation mechanism that interconnects the vertical cold water conveying pipe and the platform or a pipe on the platform, and a flexible, fluid impermeable bellows.

17 Claims, 18 Drawing Sheets

(56) References Cited

U.S. PATENT DOCUMENTS

| | | | |
|---|---|---|---|
| 4,652,025 | A | 3/1987 | Conroy, Sr. |
| 4,909,131 | A * | 3/1990 | Nix et al. ............... 92/169.1 |
| 5,112,088 | A * | 5/1992 | Moore ............... F16L 27/02 285/114 |
| 6,585,455 | B1 | 7/2003 | Petersen et al. |
| 7,040,666 | B2 * | 5/2006 | Christianson et al. ....... 285/265 |
| 7,341,283 | B2 * | 3/2008 | Moses et al. ............. 285/226 |
| 7,431,623 | B1 * | 10/2008 | Saucedo ............ B63B 38/00 441/133 |
| 2004/0245770 | A1 | 12/2004 | Christianson et al. |
| 2005/0023829 | A1 | 2/2005 | Matzen |
| 2007/0176416 | A1 * | 8/2007 | Swank ................ 285/226 |
| 2007/0196182 | A1 * | 8/2007 | Ellis ................ 405/224.4 |
| 2008/0023896 | A1 | 1/2008 | Brewster |
| 2009/0103973 | A1 | 4/2009 | Rohwedder |
| 2009/0212557 | A1 | 8/2009 | Gutierrez-Lemini et al. |
| 2010/0034592 | A1 | 2/2010 | Roodenburg et al. |
| 2013/0042613 | A1 | 2/2013 | Ross et al. |
| 2014/0059825 | A1 | 3/2014 | Riggs |

OTHER PUBLICATIONS

International Preliminary Report on Patentability for International Patent Application No. PCT/US2014/018683, issued Sep. 15, 2015, 11 pages.
First Office Action for Chinese Patent Application No. 201480027994.4, issued Sep. 2, 2016, 14 pages.
Supplementary Partial European Search Report for European Patent Application No. 14774990.7, mailed Nov. 11, 2016, 9 pages.

* cited by examiner

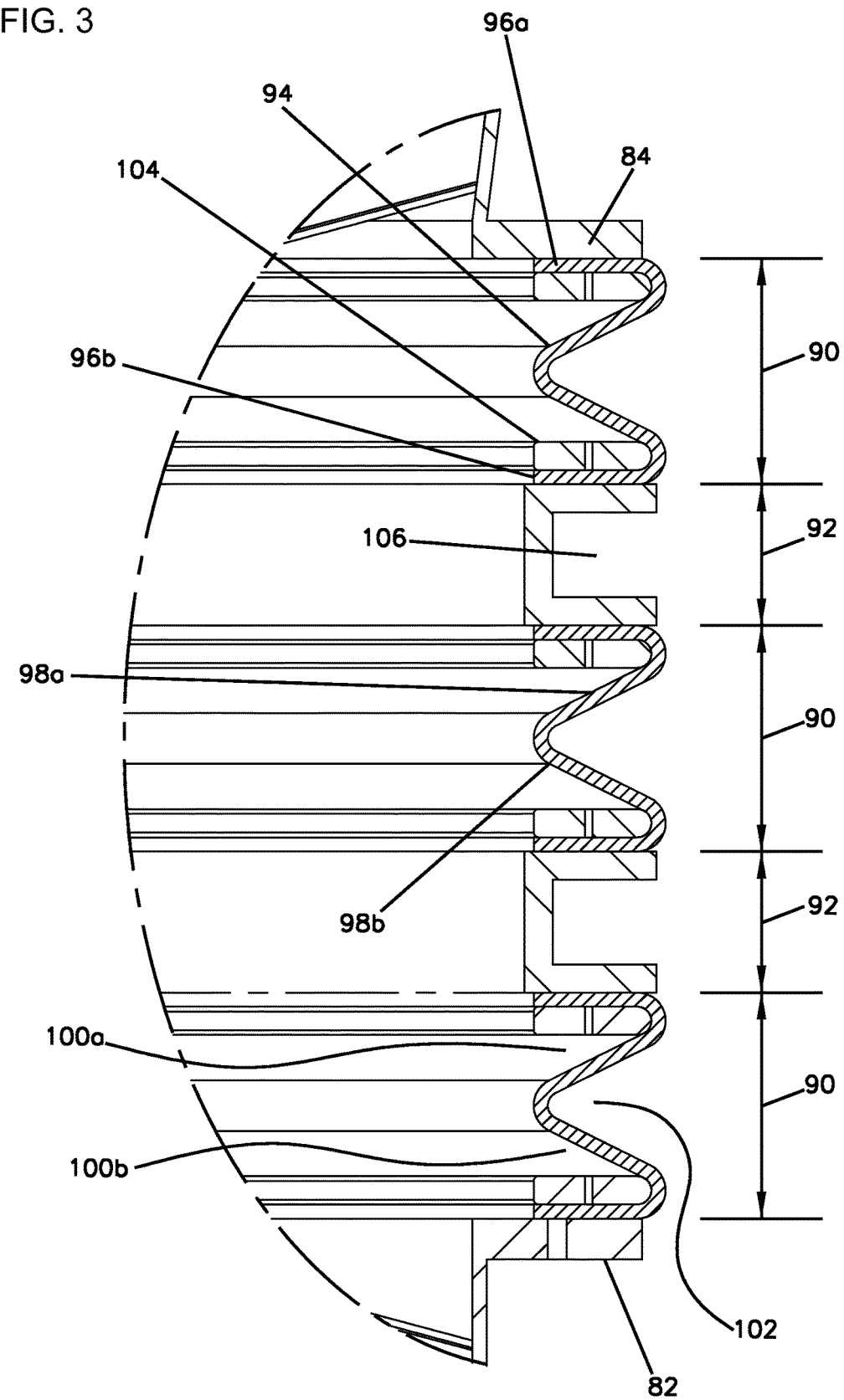

LARGE DIAMETER PIPE FLEXIBLE CONNECTION

FIELD

This disclosure relates to a flexible connection between a large diameter fluid conveying pipe and a second member, for example another pipe or a platform, that are movable relative to each other.

BACKGROUND

In some applications, there is a need to accommodate relative motions between a first fluid conveying pipe and a second member that the pipe connects to, such as a platform supporting the pipe or another pipe. One example of such an application is in Ocean Thermal Energy Conversion (OTEC) where a large diameter pipe is supported from a floating platform. The large diameter pipe is used for conveying cold water to the platform to condense the working fluid (for example, ammonia) for the OTEC power cycle. Currently, a commercial OTEC plant requires pipe of approximately 10 m or greater diameter to prevent excessive friction losses.

The floating platform for the pipe will be subject to various motions due to waves and wind forces. The pipe itself is also acted upon by currents and wave action. These effects cause the pipe to bend and vibrate at its natural frequencies and the frequencies of the forces. The relative motions and large bending moments between the pipe and the platform, or between the pipe and another pipe on the platform, need to be accommodated while containing the internal pressure and/or containing external water pressure across the joint.

SUMMARY

A flexible connection between a first fluid conveying member and a second member that are movable relative to each other is described. The flexible connection provides articulation between the first member and the second member to accommodate roll and pitch movements therebetween. The second member can be a structure that supports the first fluid conveying member or it can be a second fluid conveying member. The flexible connection is also designed to contain internal fluid pressure in the pipe and contain external pressure across the connection.

In one non-limiting example, the flexible connection is used to provide articulation between a vertical, large diameter cold water conveying pipe and a platform that supports the cold water conveying pipe, for example in an OTEC plant, to permit the pipe and the platform to roll and pitch relative to one another without imposing excessive bending moments or strain on the pipe.

In another example, the first fluid conveying member is formed by a bundle of smaller diameter pipes rather than a single large diameter pipe. A manifold near the flexible connection combines the flow from the smaller diameter pipes.

The flexible connection also contains internal pressure and contains external pressure across the connection. In one exemplary OTEC application, the fluid pressure is external. However there are applications where internal pressure is required to be contained across the connection, or maybe both. For example, in the embodiment discussed below utilizing the articulated joint inside the pipe, the flexible connection is likely to be attached before the final cold water pipe is lowered into the water. In this example, the pipe may be pressurized for lowering into the water to reduce the lifting load. During this procedure, the flexible connection will be subject to internal pressure. Once the cold water pipe is installed and the pumps are running, the connection will be subject to an external pressure from the surrounding water. Also, there are other pumping schemes where water pumps are placed at the bottom of the cold water pipe. In this case, the flexible connection would be subject to an internal pressure during operation of the OTEC plant.

The flexible joint described herein includes two primary parts. The first part is a means of articulation which allows two sections of pipe, or the pipe and its support, to bend in roll and pitch directions relative to one another without imposing excessive bending moments or strain on the pipe, while restricting yaw or torsion motion. The second part is a means of containing internal or external pressure across the articulated section.

In one embodiment, a flexible connection is provided that permits articulation between a first fluid conveying member and a second member that are movable relative to each other. The flexible connection includes a means of articulation interconnecting the first fluid conveying member and the second member. The means of articulation includes a first portion fixed to the first fluid conveying member and a second portion fixed to the second member. The flexible connection also includes a flexible, fluid impermeable bellows adjacent to the means of articulation. The flexible bellows includes a first end fixed to the first fluid conveying member and a second end fixed to the second member. The flexible bellows is configured to contain internal and/or external fluid pressure across the flexible connection.

In another embodiment, a flexible connection is provided that permits articulation between a vertical cold water conveying pipe(s) and a floating platform, for example a floating platform in an OTEC system. The flexible connection includes an articulation mechanism that interconnects the vertical cold water conveying pipe(s) and the platform, where the articulation mechanism includes a first portion fixed to the cold water conveying pipe(s) and a second portion fixed to the platform. The articulation mechanism permits relative roll and pitch movements between the cold water conveying pipe(s) and the platform. The flexible connection also includes a flexible, fluid impermeable bellows with a first end fixed to the cold water conveying pipe and a second end fixed to the platform. The bellows is configured to contain internal and/or external fluid pressure across the flexible connection.

The means of articulation and the articulation mechanism can be of any construction suitable for achieving the functions described herein. In one example, the means of articulation and the articulation mechanism can be an articulated joint disposed along a central longitudinal axis, and having a first section fixed to the fluid conveying member or the pipe and a second section fixed to the second member or the platform. In this example, the articulated joint is surrounded by the bellows.

In another example, the means of articulation and the articulation mechanism can be a gimbal joint, for example of a type that includes a gimbal, first pins oppositely disposed on the gimbal, first bearings connected between the first pins and the fluid conveying member or the pipe, second pins oppositely disposed on the gimbal, and second bearings connected between the second pins and the second member or the platform. In addition, the gimbal joint can be axially spaced from the bellows.

In another example, the means of articulation and the articulation mechanism can be a plurality of tension cylinders that are circumferentially spaced from one another around a central longitudinal axis, each tension cylinder includes a first end fixed to the fluid conveying member or the pipe and a second end fixed to the second member or the platform. In addition, the bellows can be surrounded by the plurality of tension cylinders.

DRAWINGS

FIG. 3 is a detailed view of the portion contained in circle 3 of FIG. 2.

DETAILED DESCRIPTION

Figure 1:
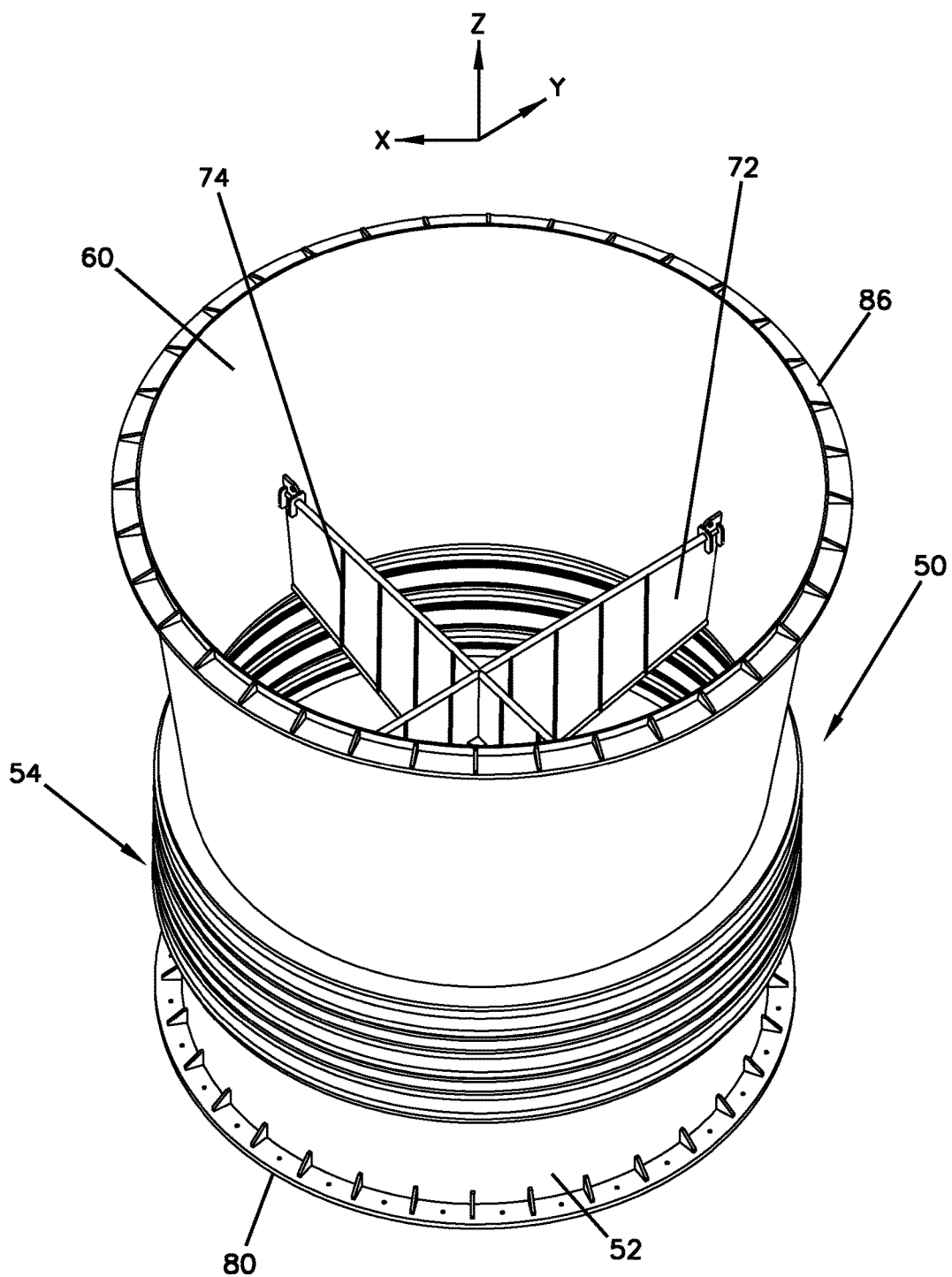
FIG. 1 is a perspective view of a first embodiment of a flexible connection.

Flexible connections between a first fluid conveying member and a second member that are movable relative to each other are described below with reference to FIGS. 1-12. The flexible connections provide articulation between the first member and the second member to accommodate the relative movements therebetween. In particular, the flexible connections accommodate roll and pitch motion or rotation between the first member and the second member, while restricting yaw or torsional motion. With reference to FIG. 1, roll motion is motion about the x-axis, pitch motion is motion about the y-axis, and yaw motion is motion about the z-axis.

As described further below, the first fluid conveying member can be a single large diameter pipe or a bundle of smaller diameter pipes. The first fluid conveying member may be referred to herein as a cold water conveying pipe which term is intended to encompass a single large diameter pipe or a bundle of smaller diameter pipes. The second member can be a structure that supports the first fluid conveying member or it can be a second fluid conveying member. The flexible connections are also designed to contain internal and/or external fluid pressure across the connections.

An exemplary, non-limiting application of the flexible connections will be described with reference to FIGS. 14 and 15 which illustrate a floating platform 10, for example a floating platform of an OTEC plant or a floating platform of a liquid natural gas plant.

The platform 10 floats in the ocean, sea or other body of water 12. The platform 10 includes an upper platform 14 that is supported above the water 12 by a plurality of support legs 16. A lower platform 18 is supported beneath the surface of the water. A large diameter, vertical, cold water conveying pipe 20 (also called the first fluid conveying member) is supported by the platform 10, in particular the lower platform 18. The pipe 20 extends vertically a distance down into the water to convey cold water to the platform 10. In one example, the pipe 20 can be around 10 m or greater in diameter to prevent excessive friction losses. The pipe 20 can be formed of a single long section of pipe, for example of steel or other material suitable for resisting salt water or fresh water. The pipe 20 can also be formed by a plurality of sections of pipe that are connected together.

In the case of an OTEC plant, water conveying pipes 22 would be joined by flanges to a) piping going to the power modules of the OTEC plant, and b) an upper flange connected to the top of a bellows discussed further below. The connection between the bellows and the pipes 22 is water tight so that water coming up through the cold water pipe 20 does not leak but instead flows into the pipes 22. In one embodiment, the flange between the pipes 22 and the bellows would be installed after the cold water pipe 20 is lowered into the water 12 and hanging off of a lower guide as discussed further below.

Figure 9:
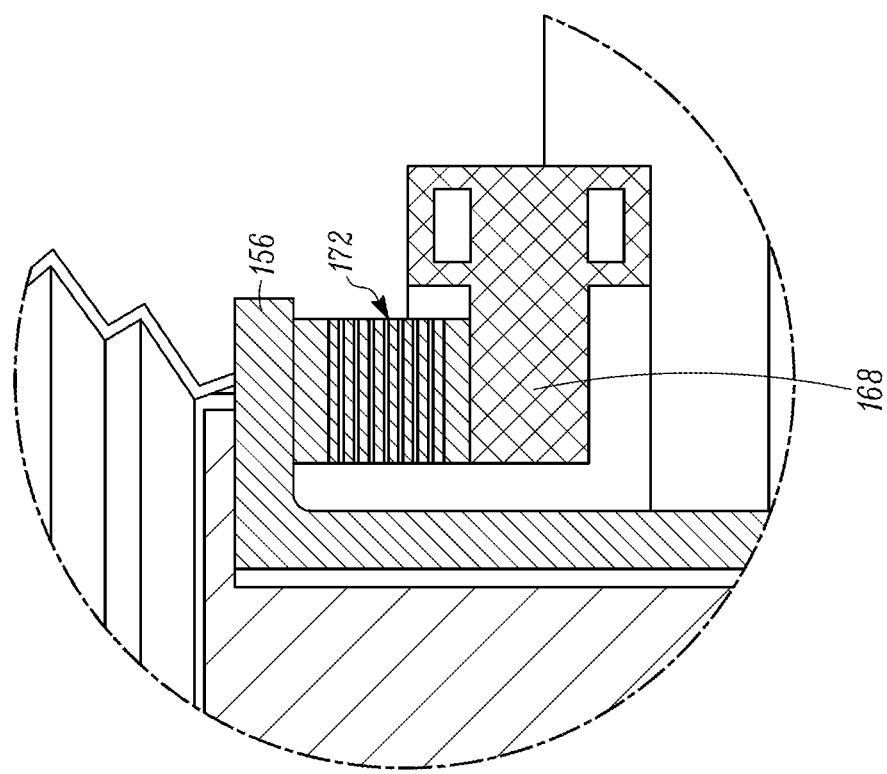
FIG. 9 is a detailed view of the portion contained in circle 9 of FIG. 7.
Figure 10:
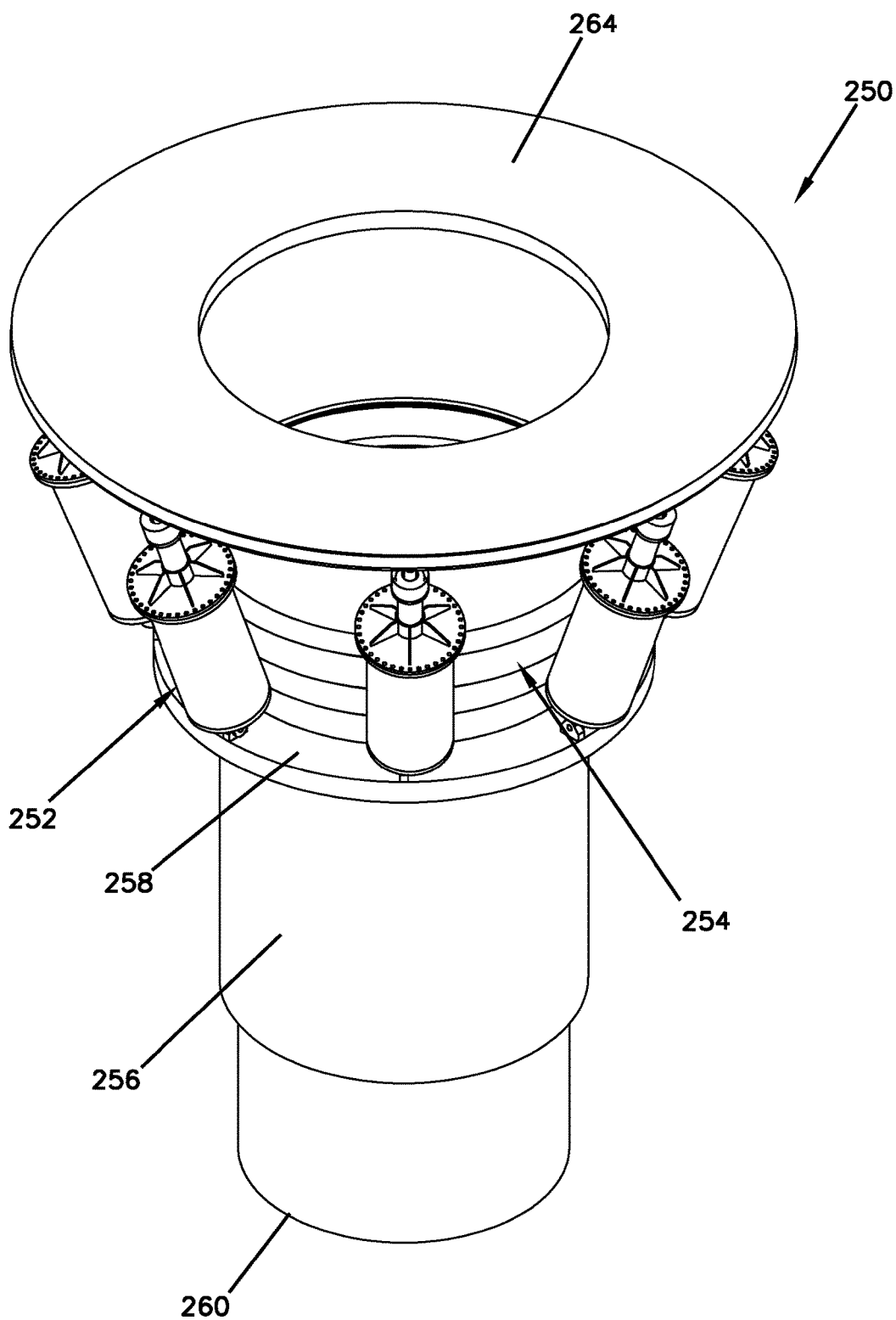
FIG. 10 is a perspective view of a third embodiment of a flexible connection.
Figure 11:
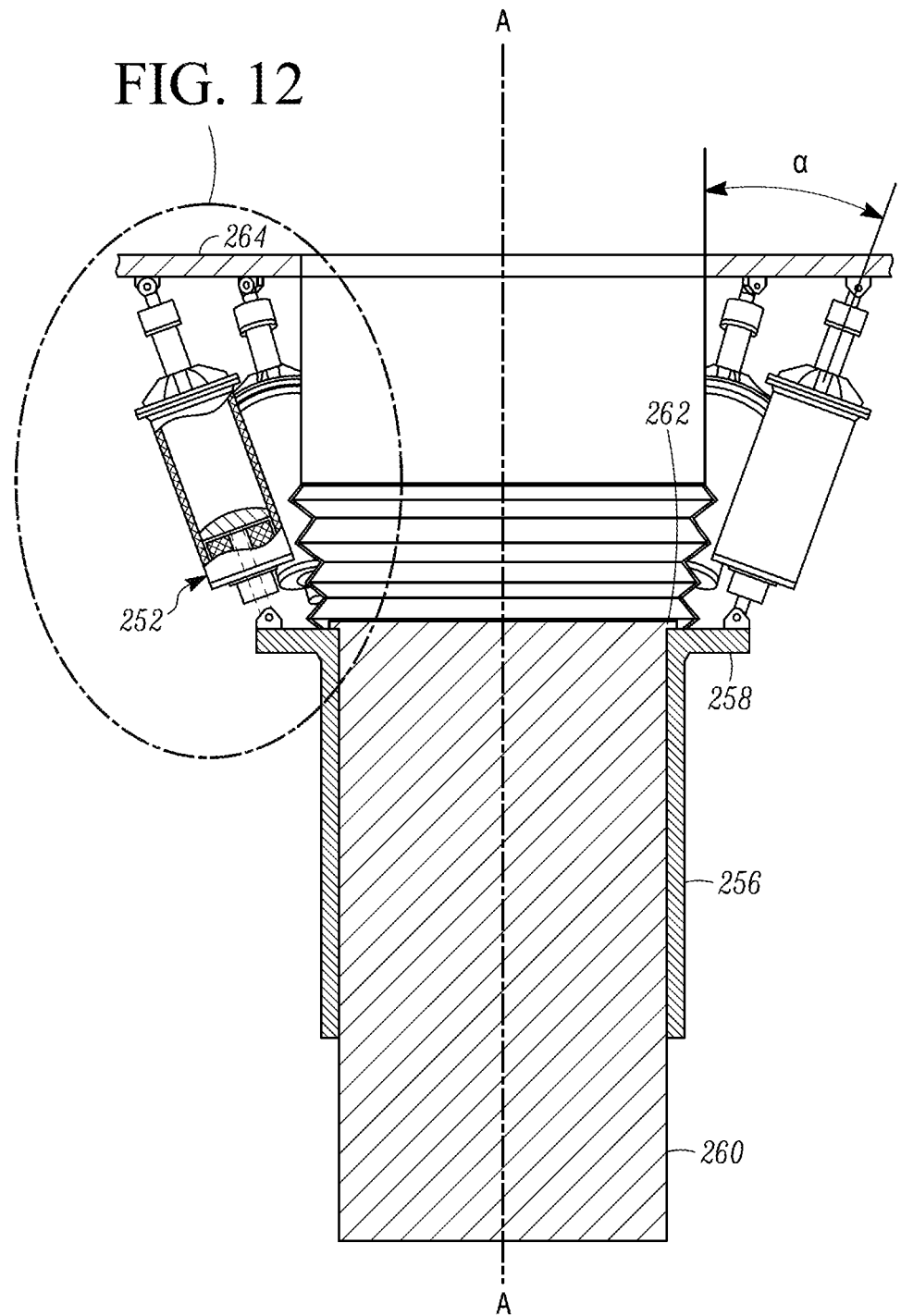
FIG. 11 is a longitudinal cross-sectional view of the flexible connection in FIG. 10.
Figure 12:
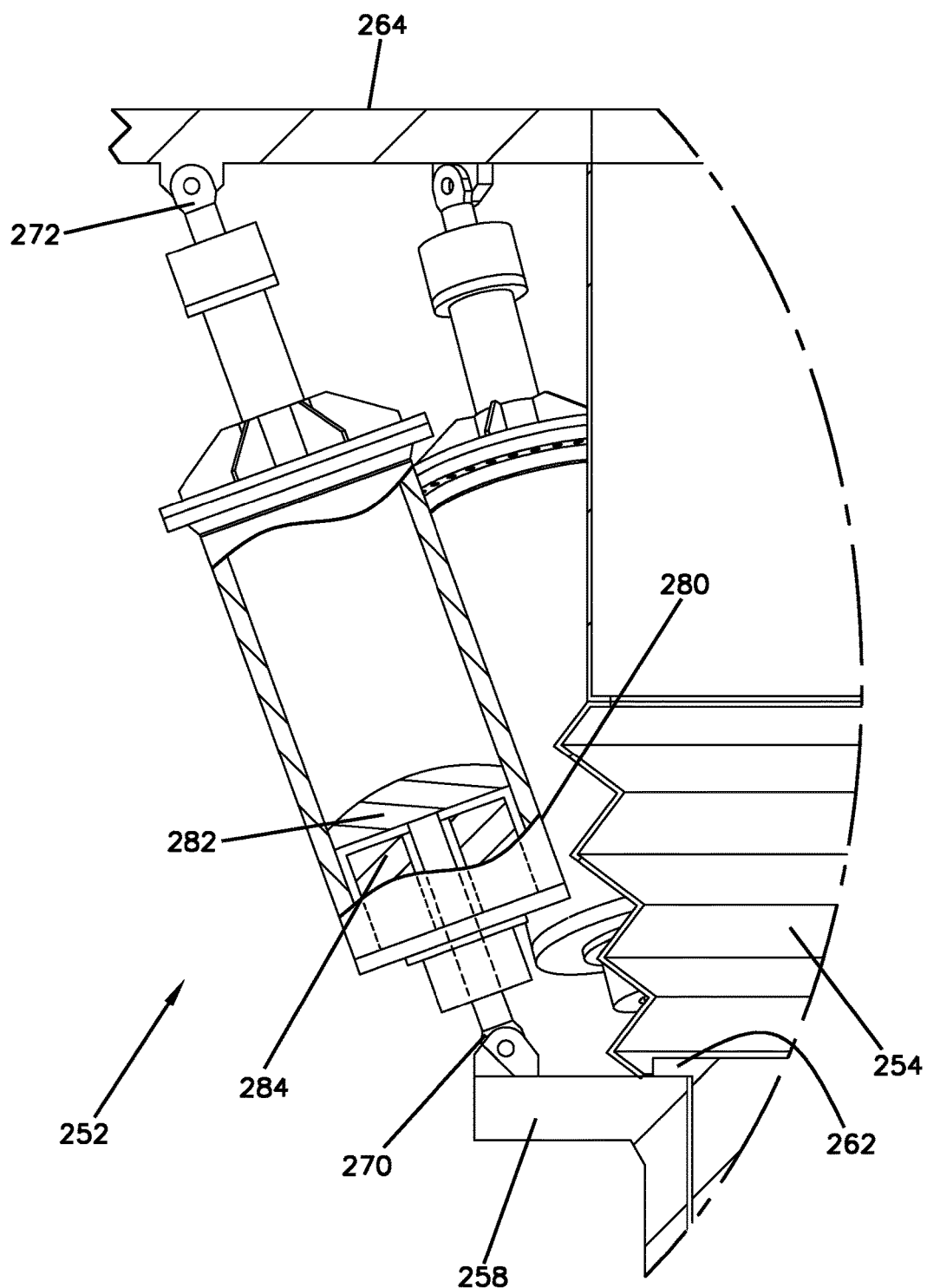
FIG. 12 is a detailed view of the portion contained in circle 12 in FIG. 11.
Figure 13:
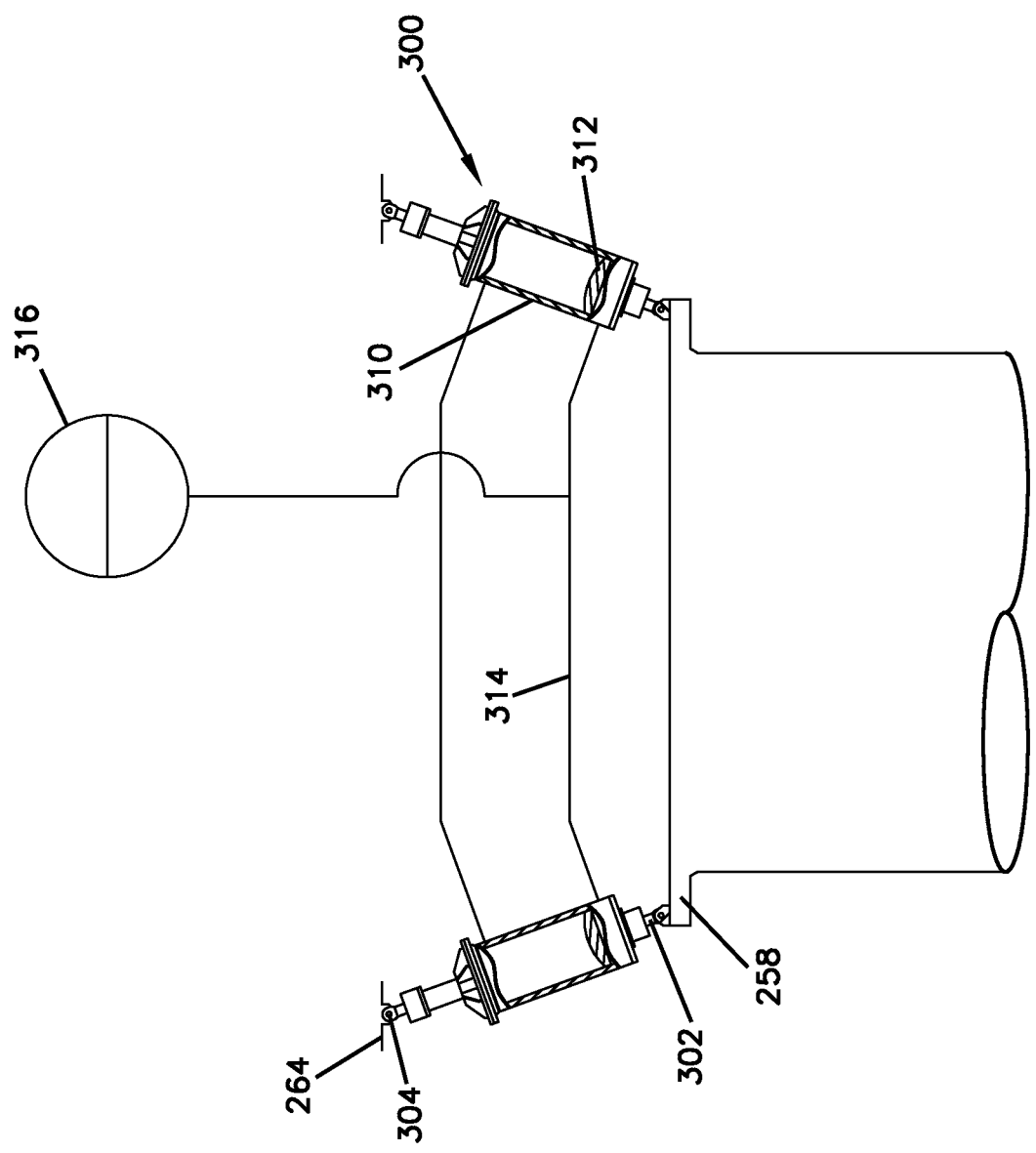
FIG. 13 illustrates an embodiment similar to FIGS. 10-12 but using fluid cylinders.
Figure 14:
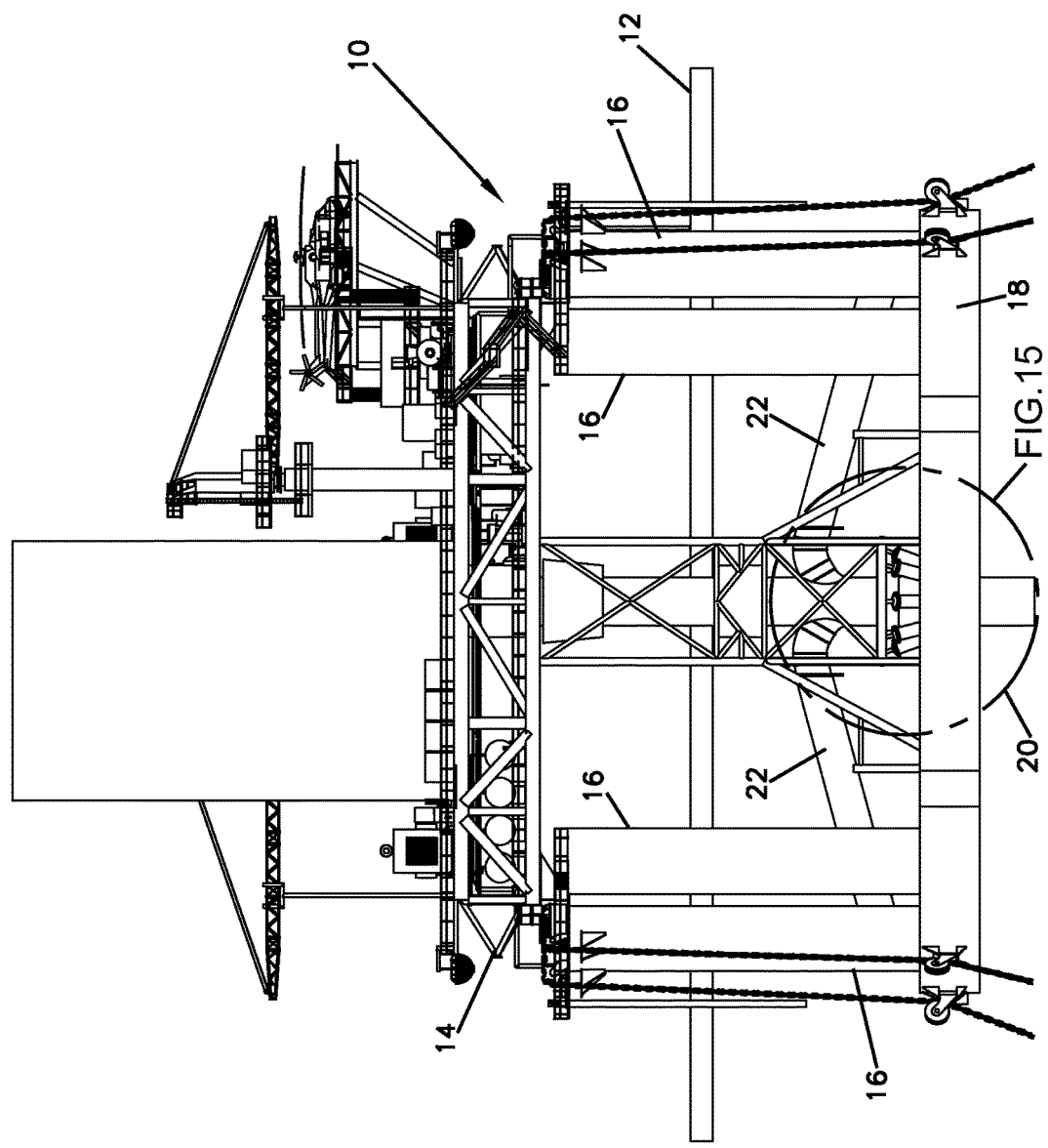
FIG. 14 illustrates a floating platform containing the flexible connection in FIGS. 10-12.
Figure 15:
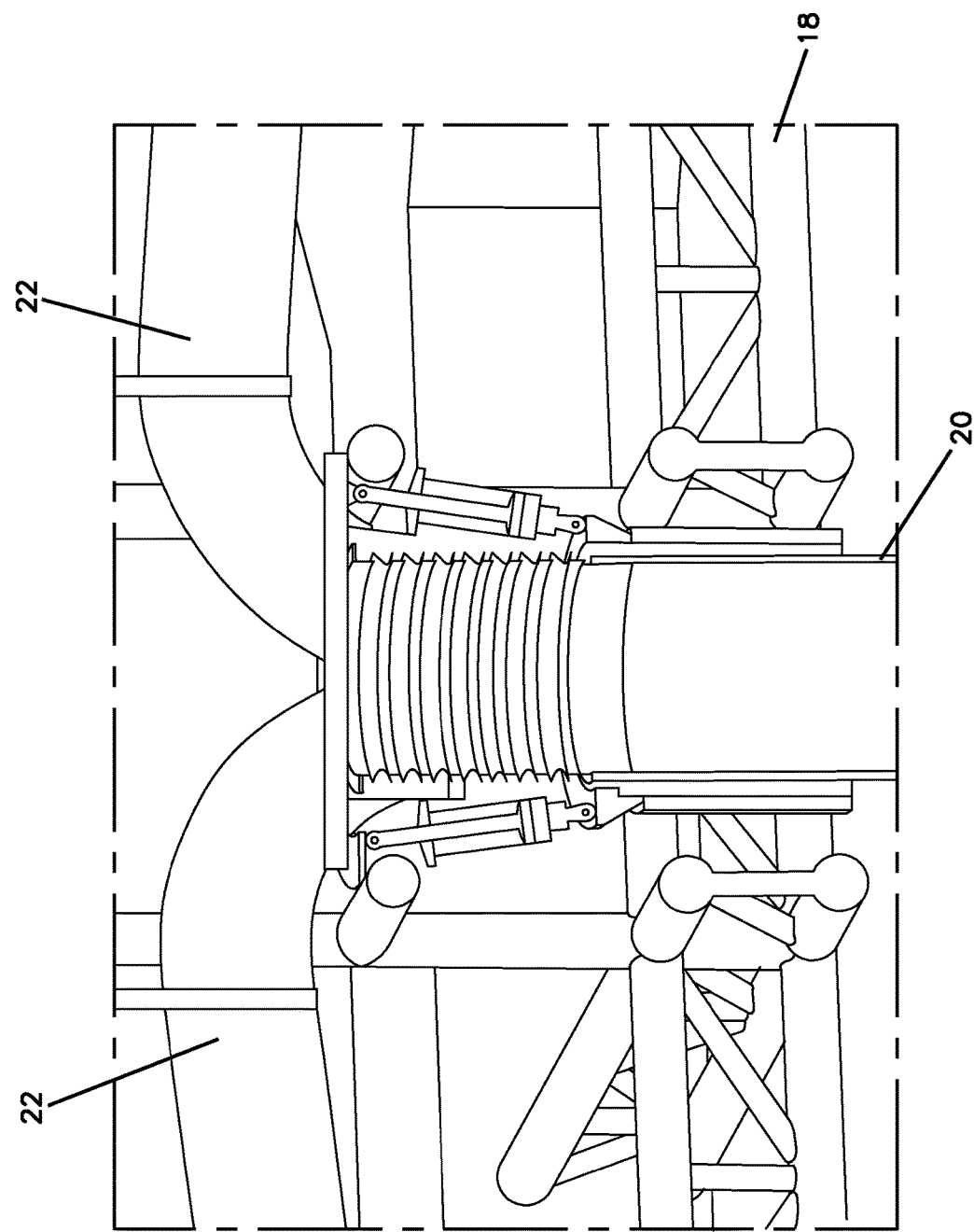
FIG. 15 is a close-up view of the flexible connection from FIG. 14.

For purposes of illustration, FIGS. 14-15 show the flexible connection of FIGS. 10-12 between the pipe 20 and the platform 10 to provide articulation between the pipe and the platform 10 to accommodate roll and pitch motions or rotations between the pipe 20 and the platform 10 without imposing excessive bending moments or strain on the pipe 20. The flexible connection also contains the internal and external fluid pressures across the connection. However, it is to be realized that other flexible connection designs, including the flexible connections of FIGS. 1-3, 3A, FIGS. 4-9, and FIG. 13 could be used on the floating platform 10 between the pipe 20 and the platform.

Figure 16:
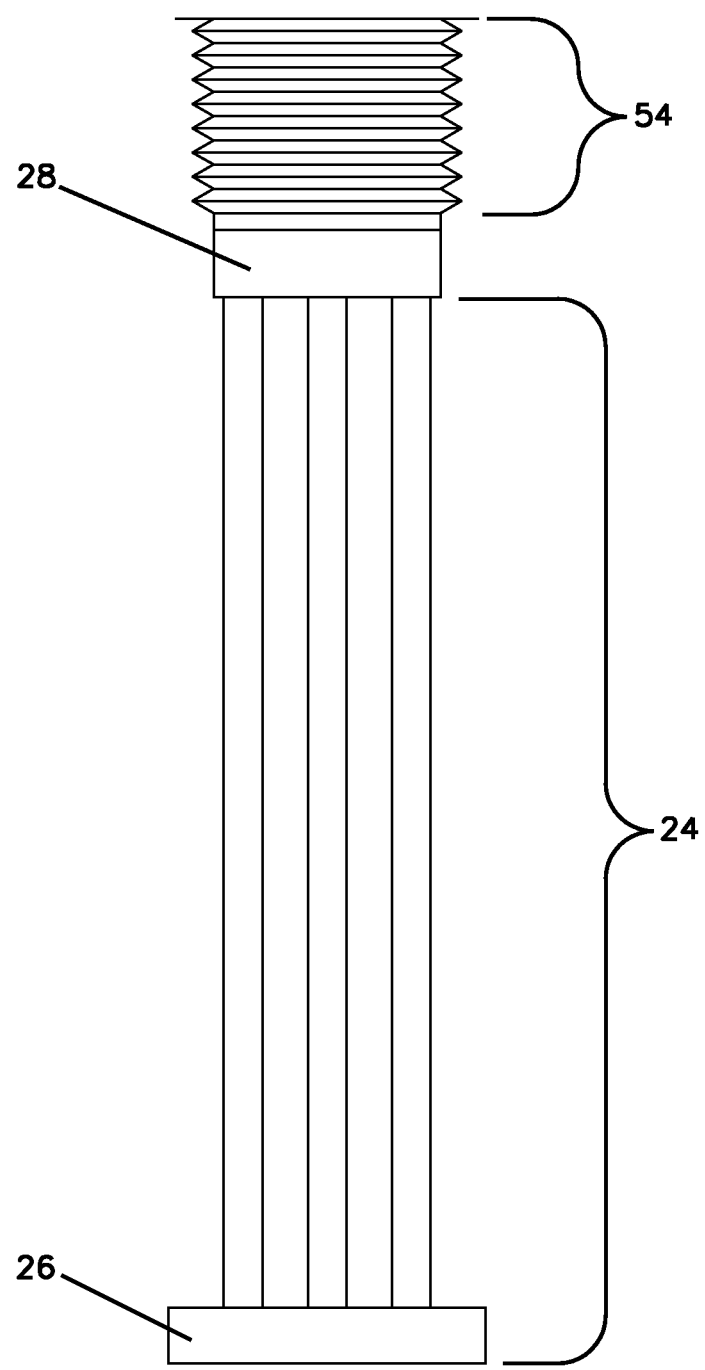
FIG. 16 illustrates a first fluid conveying member in the form of a bundle of smaller diameter pipes.

With reference to FIG. 16, instead of a single pipe 20, the first fluid conveying member can be formed by a bundle of smaller diameter pipes 24. Ballast weight 26 can be provided at the lower ends of the pipes 24 to help weigh the pipes 24 down. The pipes in the pipe bundle 24 would connect to a manifold 28 for combining flow from the smaller diameter pipes, with the bellows 54 (described in detail below) connected to the manifold. The positions of the manifold 28 and the bellows 54 relative to each other can vary, although it is believed that the manifold 28 needs to be adjacent to the flexible connection in order to combine the flow from the pipes 24.

It is to be understood that the flexible connections described herein are not limited to use in an OTEC application. The flexible connections can be used to connect a first pipe to any support structure or to another pipe in any application including, but not limited to, a floating liquid natural gas plant. As used in this patent application, the pipe 20 or the bundle of smaller diameter pipes 24 can also be referred to as a first fluid conveying member. The platform 10, including the lower platform 18, can be referred to as a second member. The second member can also be a second pipe.

The details of different embodiments of flexible connections will now be described. In each embodiment, the flexible connection includes two primary parts. The first part is a means of articulation which allows two sections of pipe, or the pipe and its support, to rotate in the roll and pitch directions relative to one another without imposing excessive bending moments or strain on the pipe, while restraining or restricting yaw or torsional rotation. The second part is a means of containing internal and external pressure across the articulated section.

Figure 2:
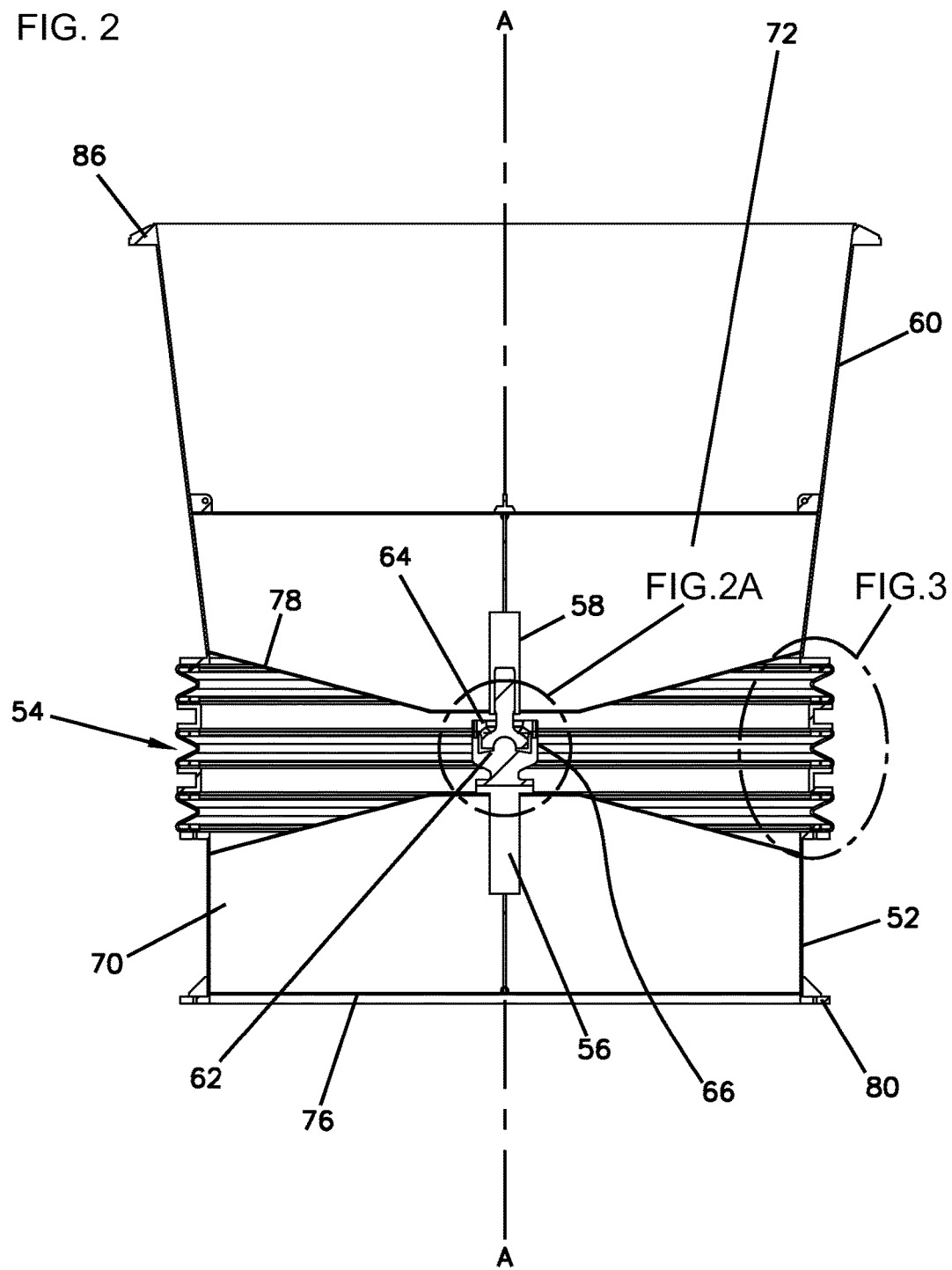
FIG. 2 is a longitudinal cross-sectional view of the flexible connection in FIG. 1.

A first embodiment of a flexible connection 50 is illustrated in FIGS. 1-3. The connection 50 comprises an articulated joint that is disposed along a central longitudinal axis A-A of a first fluid conveying member 52, and a flexible, fluid impermeable bellows 54. The articulated joint includes a first section 56 that is fixed to the first fluid conveying member 52 and a second section 58 that is fixed to a second member 60. In use, the member 52 is fixed to or forms part of the cold water pipe, while the member 60 is fixed to the platform 10 or another pipe. In addition, the members 52, 60 can be around 10 m or greater in diameter to match the diameter of the cold water pipe.

Figure 2A:
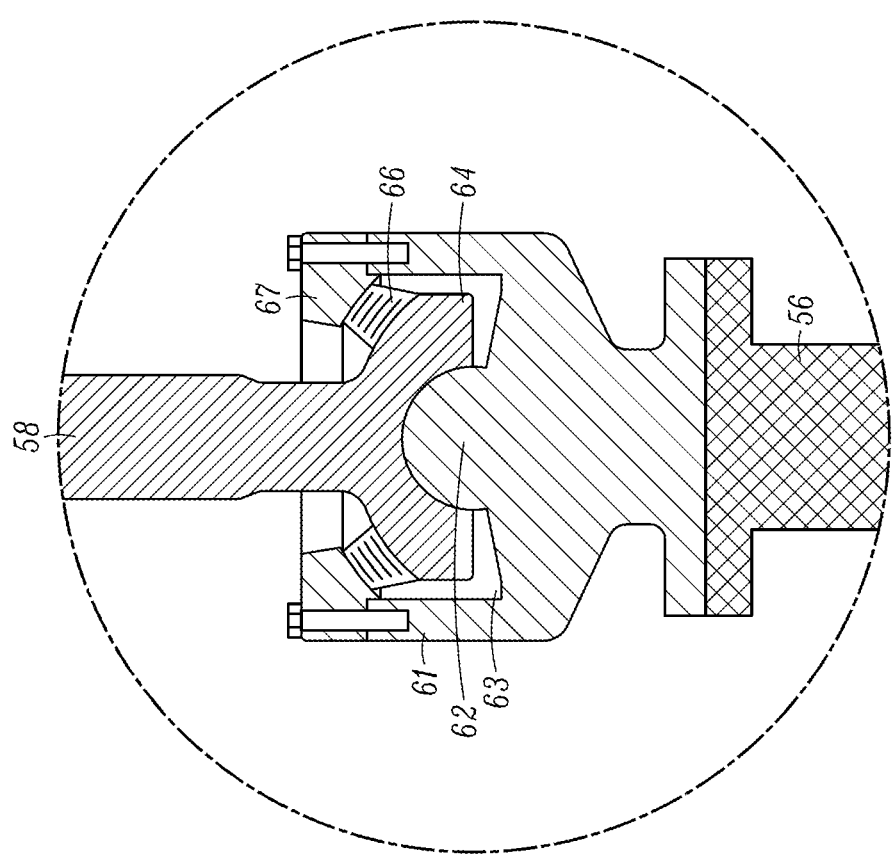
FIG. 2A is close up view of the area in circle 2A of FIG. 2.

Any type of connection between the first section 56 and the second section 58 that permit relative roll and pitch rotations between the two sections about the x-axis and y-axis respectively, while restraining yaw rotation about the z-axis, can be used. For example, in the embodiment illustrated in FIGS. 2 and 2A, the first section 56 has an upper end with a cylindrical sleeve 61 extending upwardly therefrom that forms a cup-shaped area 63. A hemispherical ball 62 is formed at the upper end of the first section 56 within the area 63. The second section 58 has a lower end extending into the area 63 and that defines spherical surface 64 that is disposed on the hemispherical ball 62. In addition, an elastomeric bearing 66 is disposed within the area 63, fixed at its lower end to the spherical surface 64 and fixed at its upper end to a cap 67 that is fixed to the upper end of the sleeve 61. This general construction of ball 62, spherical surface 64, elastomeric bearing 66, and cap 67 is known in the art.

With reference to FIGS. 1 and 2, the first and second sections 56, 58 are supported within the joint 50 by load transfer beams. In particular, a first set of load transfer beams 70 are disposed in the member 52 and have a first end fixed to the first section 56 and a second end fixed to an interior surface of the member 52. Likewise, second load transfer beams 72 are disposed in the member 60 and have a first end fixed to the second section 58 and a second end fixed to an interior surface of the member 60.

The load transfer beams 70, 72 extend substantially radially relative the central longitudinal axis A-A and are generally planar with the planes thereof oriented substantially parallel to the central longitudinal axis A-A. The load transfer beams 70, 72 transfer loads between the members 52, 60 and the first and second sections 56, 58. The members 52, 60 and the beams 70, 72 are preferably formed of metal.

As best seen in FIG. 1, the beams 70, 72 include stiffeners 74 disposed thereon for stiffening the beams 70, 72 to prevent buckling of the beams 70, 72 (the stiffeners on the beams 70 are not visible in FIG. 1 but are similar to the stiffeners on the beams 72). In addition, because water is intended to flow upwardly through the connection 50, leading edges (or flanges) 76, 78 of the beams 70, 72 can be streamlined, for example by rounding the leading edges 76, 78, to reduce turbulence. It is preferred that the beams 70 in the member 52 be aligned with the beams 72 in the member 60 to maximize the open space through the connection 50, which allows equipment to be passed through the connection 50 during or after installation if necessary.

As shown in FIGS. 1 and 2, the member 52 has a lower end having a flange 80 to facilitate connecting the member 52 to the upper end of the pipe 20 (or pipes 24). The upper end of the member 52 also has a flange 82, best seen in FIG. 3, which is used to connect to the bellows 54.

In the illustrated embodiment, the member 60 has a tapered shape with a smaller diameter end thereof having a flange 84 for fixing to the bellows (as best seen in FIG. 3) and a larger diameter end having a flange 86 fixed to the platform or another pipe. As evident from FIGS. 1 and 2, the member 60 tapers continuously from the smaller diameter end that is fixed to the bellows 54 to the larger diameter end. If the member 60 is connected to another pipe, the member 60 may not be tapered.

As evident from FIGS. 1 and 2, the bellows 54 surrounds the articulated joint. The bellows 54 is configured to provide flexibility between the two members 52, 60 as well as maintain pressure integrity across the connection. Details of an exemplary embodiment of the bellows 54 will be described with reference to FIG. 3.

In the illustrated embodiment, the bellows 54 comprises a plurality of flexible ring segments 90 that are separated by steel channel ring segments 92. The ring segments 90 and the channel ring segments 92 are circumferentially continuous. Each flexible ring segment 90 includes a ring of elastomer 94 having a pair of end flanges 96a, 96b and a pair of intermediate flange 98a, 98b that are integrally formed and interconnected so as to define two radially inward facing valleys 100a, 100b and a radially outward facing valley 102. The elastomer ring 94 thus approximately has the shape of a sideways letter M that is rotated in a clockwise direction 90 degrees. Flat steel rings 104 are disposed in the radially inward facing valleys 100a, 100b.

With continued reference to FIG. 3, the steel channel ring segments 92 are formed by generally C-shaped rings that define radially outward facing channels 106. In the illustrated embodiment, there are 3 ring segments 90 and two ring segments 92. For the upper ring segment 90, the end flange 96a is clamped, sandwiched or otherwise disposed and fastened between (hereinafter, disposed and fastened between) the flange 84 on the member 60 and one of the rings 104. The end flange 96b of the upper ring segment 90 is disposed and fastened between one of the rings 104 and the upper part of the C-shaped ring. For the middle ring segment 90, the end flanges 96a, 96b are disposed and fastened between the rings 104 and the bottom part of one C-shaped ring and the upper part of the other C-shaped ring. For the bottom ring segment 90, the end flange 96a is disposed and fastened between the bottom part of the lower C-shaped ring and the ring 104 and the end flange 96b is disposed and fastened between the ring 104 and the flange 82 on the member 52.

Any means for fastening the end flanges 96a, 96b between the rings 104, flanges 82, 84 and the C-shaped rings can be used as along as a secure, watertight attachment is achieved. For example, the end flanges 96a, 96b can be bonded to the adjacent elements using an adhesive that is cured. However, mechanical fasteners could be used if adequate sealing is achieved or provided between the segment joints.

Figure 3A:
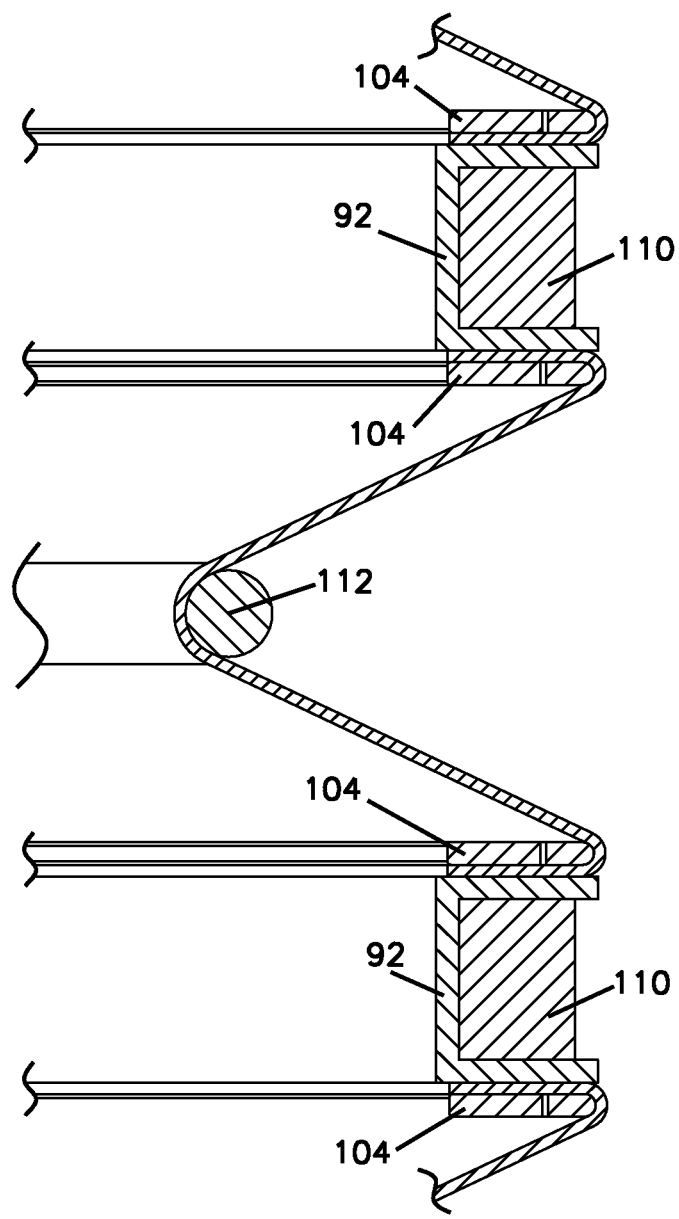
FIG. 3A illustrates a variation of the flexible bellows described herein.

In an underwater application, for example in an OTEC plant, where the connection 50 is underwater, because of the loading on the bellows 54, it is preferred to make the connection 50 approximately, or even substantially, neutrally buoyant. Some positive buoyancy may be desired to ensure against collapse of the bellows 54. However, in situations where some positive buoyancy is not desired, the connection can be made substantially neutrally buoyant. With reference to FIG. 3A, the buoyancy of the connection can be controlled by locating buoyant element(s) 110 in the radially outward facing channels of the C-shaped rings of one or more of the ring segments 92. FIG. 3A illustrates buoyant elements(s) 110 in each channel. However, depending upon the buoyancy requirements and number of ring segments 92, buoyant element(s) can be provided in a lesser or greater number of channels. In addition, the buoyant element(s) need not occupy the entire radial and/or circumferential extent of the channels. The buoyant element(s) can be formed by any element(s) that can provide buoyancy. Examples include, but are not limited to, foam, gel, air filled elements, and the like.

In addition, with continued reference to FIG. 3A, if the connection is subject to internal pressure, a means can be added to the bellows 54 to prevent the elastomer rings 94 from flipping outwards (i.e. inverting). As shown in FIG. 3A, a flexible, elastic ring 112 can be fitted at the root of the outward facing valley 102 of each elastomer ring 94. The rings 112 should be stiff enough to carry the hoop loads from internal pressure that would be conveyed through the elastomer rings 94, but are flexible enough in stretch to allow the rings 104 to separate and the valleys 102 to open up. In other words, the diameter of the rings 112 should be free to increase.

In an exemplary use of the connection 50, the bottom end of the member 52 would be fixed to the cold water pipe via the flange 80 and a corresponding flange on the cold water pipe. The upper end of the member 60 would be fixed to a suitable flange or coupling on pipes of the platform via the flange 86. The flexible connection 50 will thus permit relative movements between the cold water pipe and the pipes and other elements of the platform with the bellow containing pressure across the connection.

With reference now to FIGS. 4-9, another embodiment of a flexible connection 150 is illustrated. In this embodiment, the flexible connection 150 is configured as a gimbal joint that is axially spaced from the flexible, fluid impermeable bellows. More particularly, in the illustrated embodiment, the gimbal joint employs elastomeric bearings that act as hinges for the gimbal joint. The elastomeric bearings are preferably of a rubber/steel sandwich type which provides the ability of the bearings to last a large number of years, for example 20+ years, under water without maintenance. However, it is believed that other bearings could be used, such as conventional roller, hydrostatic or bushing type bearings, but those bearings would require more maintenance than elastomeric bearings.

Figure 4:
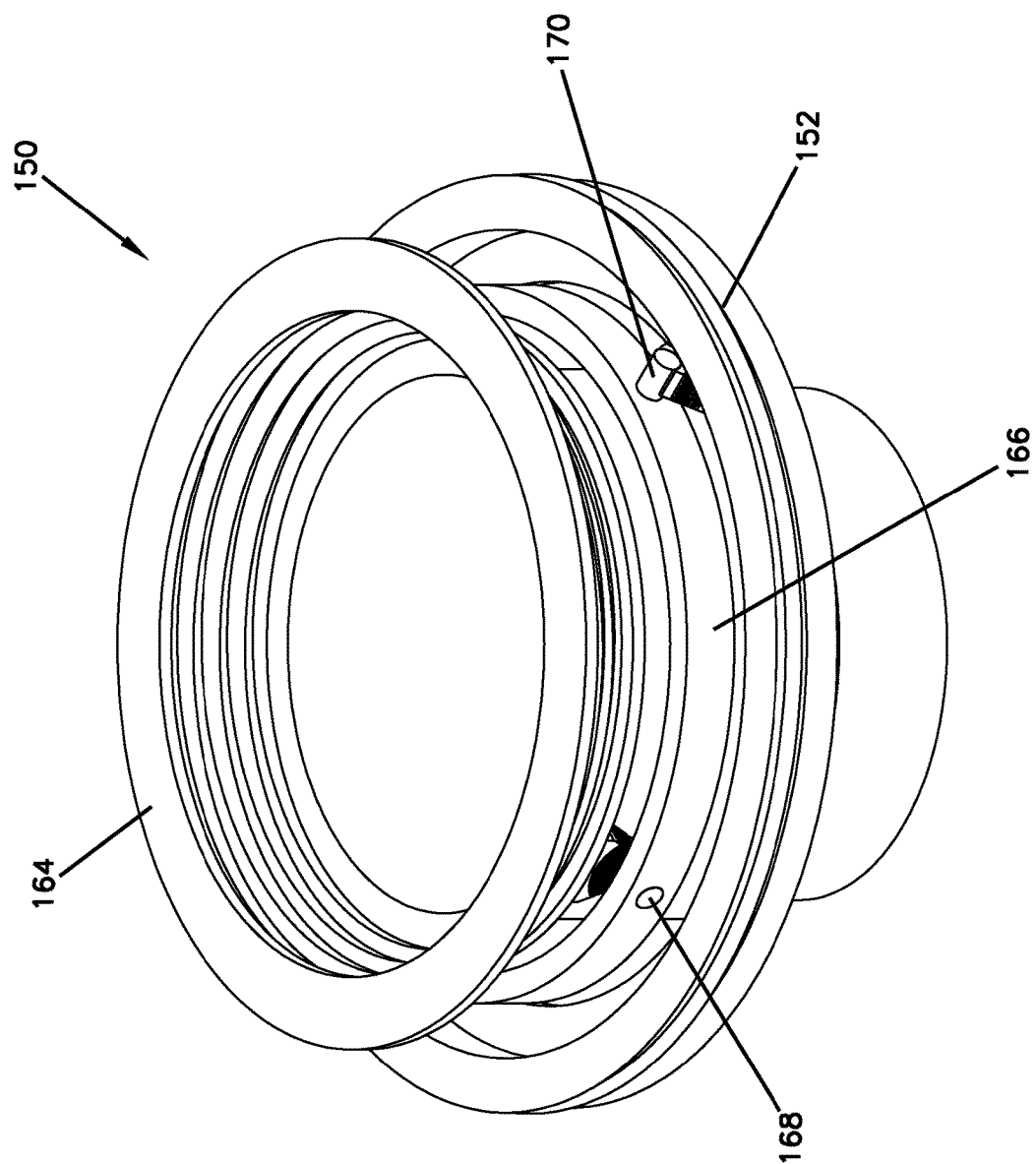
FIG. 4 is a perspective view of a second embodiment of a flexible connection.
Figure 5:
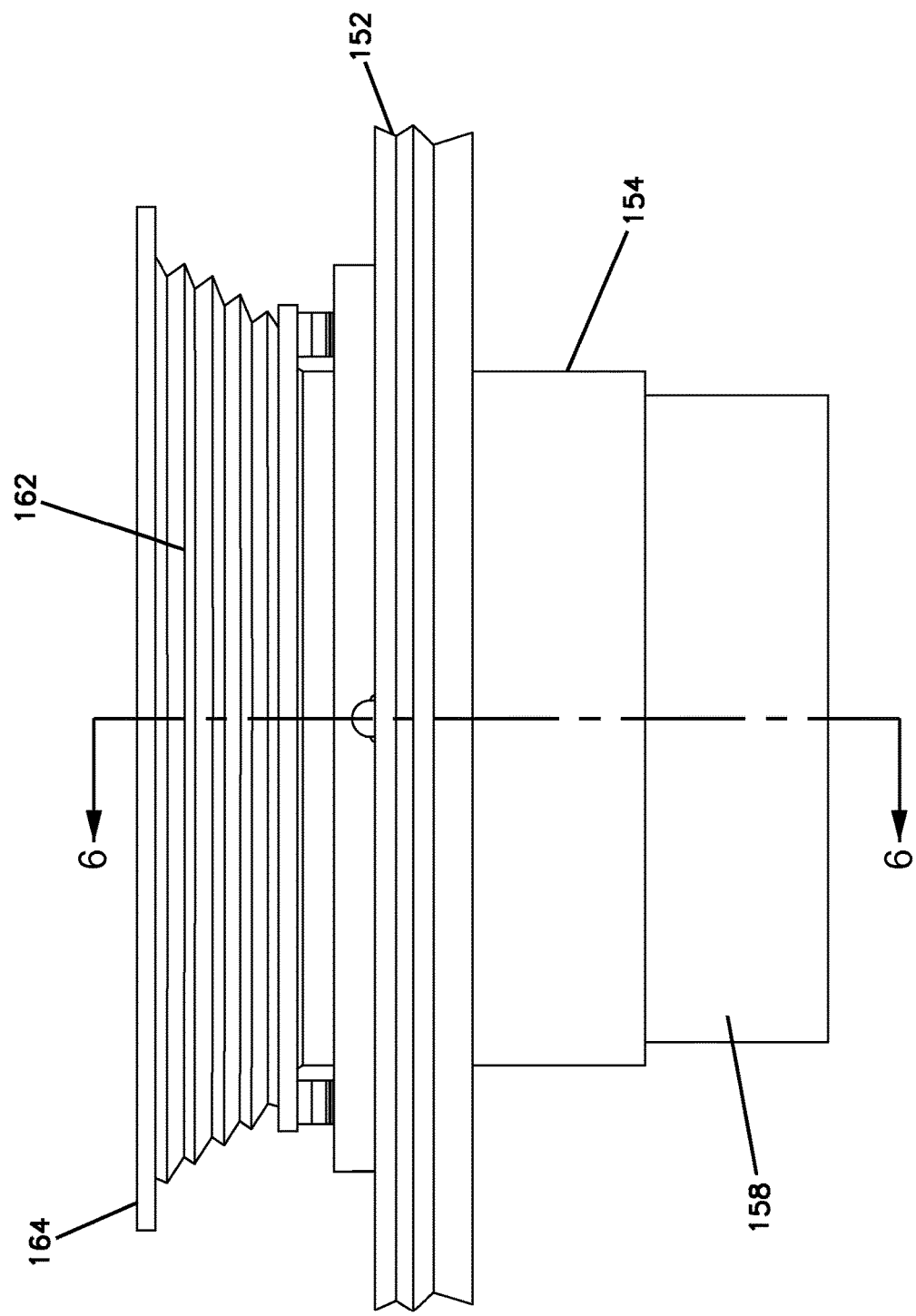
FIG. 5 is a side view of the flexible connection in FIG. 4.
Figure 6:
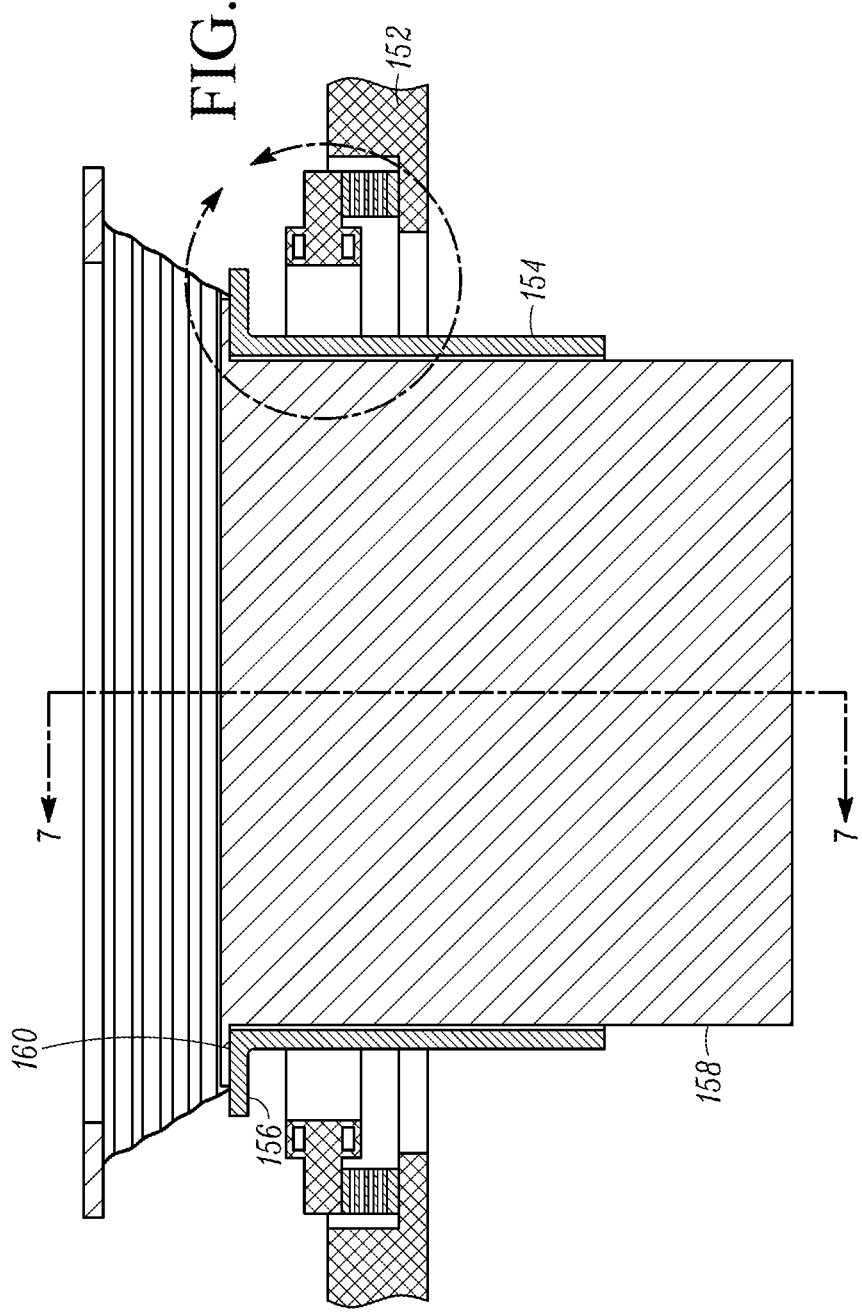
FIG. 6 is a longitudinal cross-sectional view taken along line 6-6 in FIG. 5.
Figure 7:
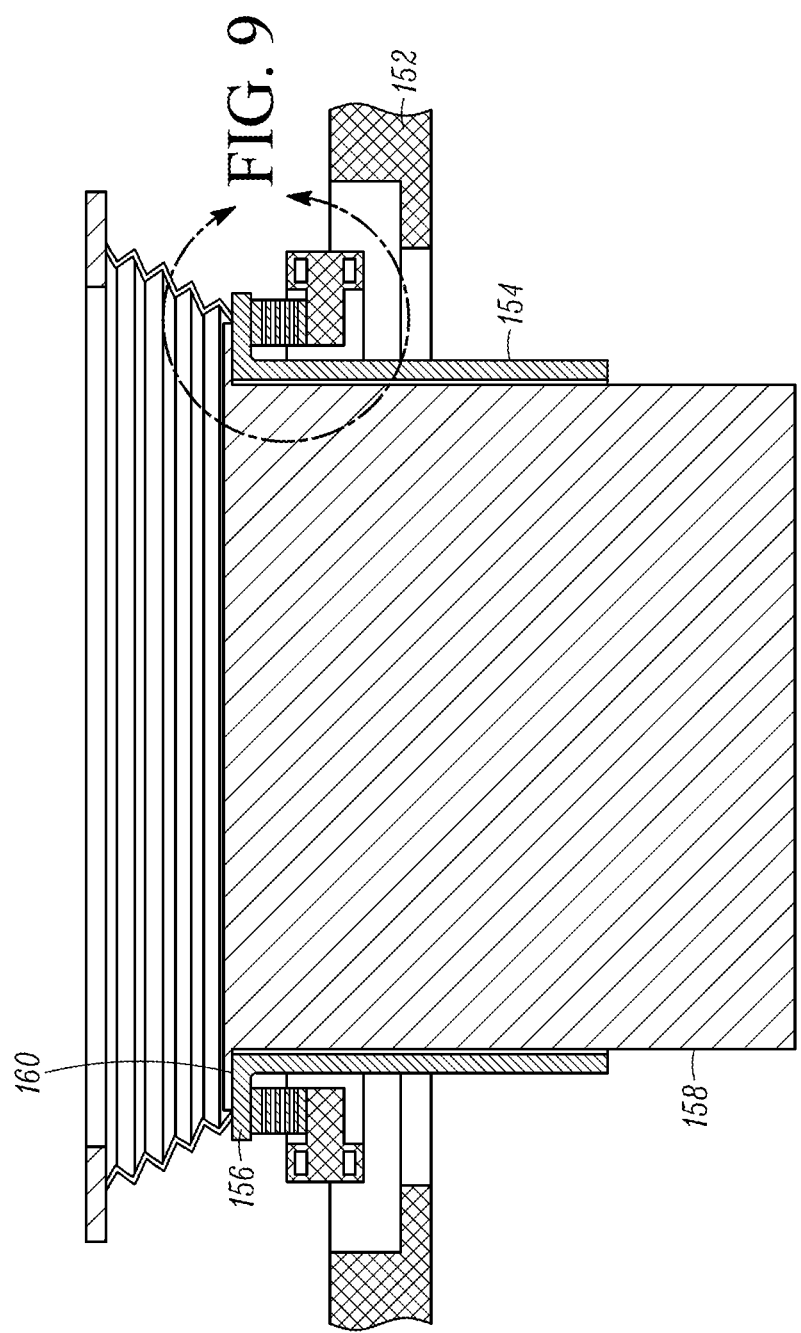
FIG. 7 is another longitudinal cross-sectional view taken along line 7-7 in FIG. 6.

With reference to FIGS. 4-6, a portion of the floating platform 152 is illustrated. The connection 150 includes a cylindrical sleeve 154 having a flange 156 at the upper end thereof that extends upwardly through the platform 152. A cold water pipe 158, similar to the pipe 20, extends upwardly through the sleeve 154 and has a flange 160 at the top end thereof that seats on the flange 156 as best seen in FIGS. 6-9.

A flexible, fluid impermeable bellows 162 extends upwardly from the flange 156. In particular, with reference to FIGS. 6-9, the bellows 162 includes a flange (not shown) at the lower end thereof that is sealingly secured to the flange 156. The opposite end of the bellows 162 includes a flange 164 (FIGS. 4-6) that in use is fixed to the piping 22 on the floating platform. The bellows 162 is identical in construction to the bellows 54 illustrated in FIG. 3.

Figure 8:
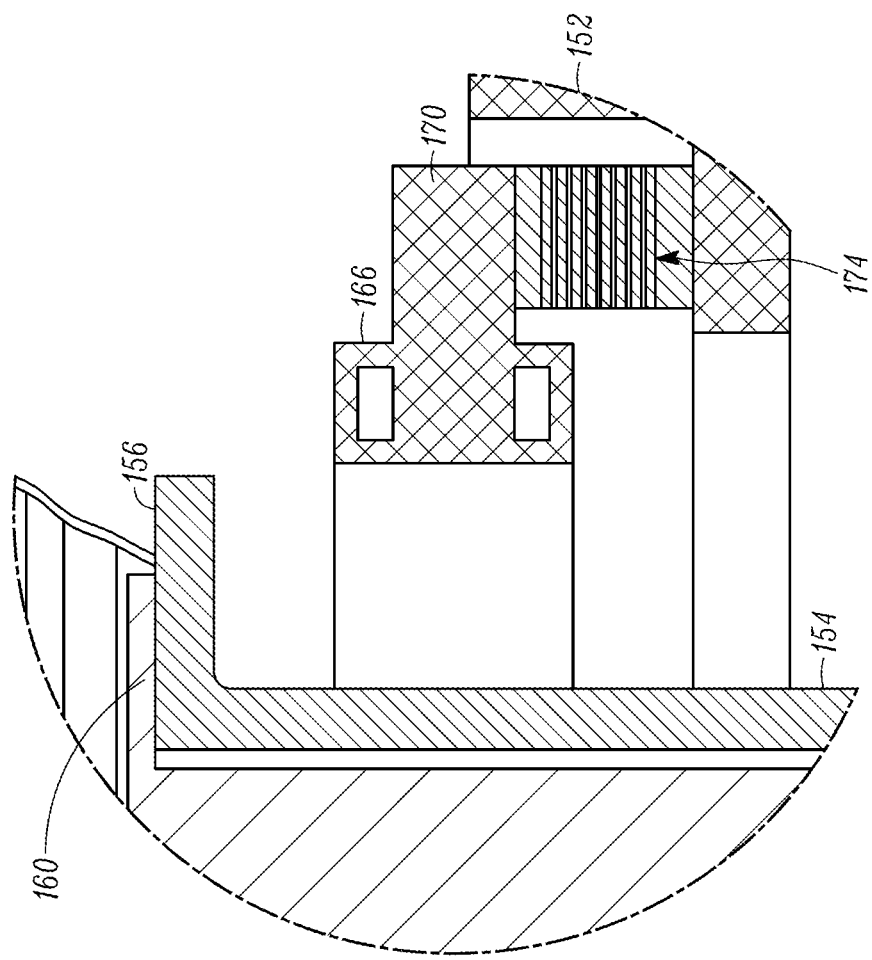
FIG. 8 is a detailed view of the portion contained in circle 8 of FIG. 6.

The gimbal joint 150 includes a circumferentially continuous gimbal ring 166. The ring 166 has first pins 168 spaced 180 degrees apart from one another on the ring so that the pins 168 are oppositely disposed, and second pins 170 spaced 180 degrees apart from one another and spaced 90 degrees from the pins 168, so that the pins 170 are oppositely disposed. As shown in FIG. 9, the pins 168 project radially inwardly while the pins 170 project radially outwardly as shown in FIG. 8. First elastomeric bearings 172 are connected between the first pins 168 and the flange 156, and second elastomeric bearings 174 are connected between the second pins 170 and the platform 152. As indicated above, it is preferred that the elastomeric bearings are comprised of alternating layers of rubber and steel sandwiched together to reduce or eliminate maintenance. However, the elastomeric bearings 172, 174 can be replaced by other types of bearings as discussed above.

In an exemplary use of the connection 150, the sleeve 154 is extended upwardly through a hole in the floating platform. The lower end of the bellows is fixed to the top end of the sleeve 154 and the top end of the bellows is fixed to a suitable flange or coupling on the pipes of the floating platform. The gimbal ring 166 is also mounted between the sleeve 154 and the platform as described above. The cold water pipe 158 is then lowered downward through the bellows until the flange 160 thereof rests on the flange 156. The flexible connection 150 will thus permit relative roll and pitch movements between the cold water pipe and the pipes and other elements of the platform with the bellows containing pressure across the connection.

With reference now to FIGS. 10-12, another embodiment of a flexible connection 250 is illustrated. In this embodiment, the flexible connection 250 includes a plurality of passive, elastomeric tension cylinders 252 that surround a flexible, fluid impermeable bellows 254.

Like with the connection 150, the connection 250 includes a cylindrical sleeve 256 having a flange 258 at the upper end thereof that in use extends upwardly through the floating platform as shown in FIG. 15. A cold water pipe 260, similar to the pipe 20, extends upwardly through the sleeve 256 and has a flange 262 at the top end thereof that seats on the flange 258 as best seen in FIG. 12.

The bellows 254 extends upwardly from the flange 258. In particular, with reference to FIGS. 11 and 12, the bellows 254 includes a flange (not shown) at the lower end thereof that is sealingly secured to the flange 258. The opposite end of the bellows 254 includes a flange 264 (FIGS. 10-12) that in use is fixed to the piping on the floating platform. The bellows 254 is identical in construction to the bellows 54 illustrated in FIG. 3.

The tension cylinders 252 are circumferentially spaced from one another around the central longitudinal axis A-A of the pipe 260. As best seen in FIG. 12, each tension cylinder 252 includes a first end 270 fixed to the flange 258 and a second end 272 fixed to the flange 264. As indicated above and with reference to FIG. 12, the tension cylinders 252 are preferably passive, elastomeric tension cylinders each of which includes a cylinder 280 that is fixed to the second end 272, a piston 282 disposed in the cylinder and fixed to the first end 270, and an elastomeric member 284 disposed in the cylinder 280 between, and engaged with, the piston 282 and the end of the cylinder closest to the end 270. The elastomeric member 284 can be any form of elastomeric material that provides damping to the piston 282. For example, the elastomeric member 284 can be a single block of elastomeric material that is configured to allow the piston rod to extend through. Alternatively, the elastomeric member 284 can be formed from a stack of alternating elastomeric and steel rings, individual elastomeric members arranged circumferentially around the piston rod, and the like. Therefore, the term elastomeric member is intended to encompass single monolithic elastomeric structures as well as structures formed by a plurality of individual elastomeric and elastomeric and steel elements.

As shown in FIGS. 11 and 12, the tension cylinders 252 are disposed at an angle α to the central longitudinal axis A-A. The angle α is chosen so as to resist shear forces and help keep alignment between the cold water pipe and the platform. For example, the angle α can be at least about 5 degrees. In another example, the angle α can be at least about 10 degrees. In another example, the angle α can be between about 5 degrees and about 10 degrees. In the described construction, the tension cylinders 252 are not constant tension and act like non-linear springs.

Although the tension cylinders 252 have been described as being passive elastomeric devices, hydraulic tension cylinders 300 can be used as illustrated in FIG. 13. Like the cylinders 252, the cylinders 300 can have a first end 302 connected to the flange 258 and a second end 304 connected to the flange 264. Each cylinder 300 includes a cylinder 310 and a piston 312 disposed in the cylinder 310. In this embodiment, the cylinder 310 is connected to the first end 302 while the piston 312 is connected to the second end 304. The cylinders 310 can be interconnected by fluid lines 314 so that roll and pitch motions between the cold water pipe and the platform forces hydraulic fluid from one cylinder to another. In addition, an accumulator 316 can be fluidly connected to the lines 314. In an alternative, the cylinders 310 are not interconnected by fluid lines but instead each cylinder 310 has its own accumulator or shares an accumulator with one or more other cylinders 310 so that roll and pitch motions force hydraulic fluid from the cylinders into accumulators and from the accumulators into the cylinders.

Mounting of the connection 250 relative to the platform is discussed above in the description of FIGS. 14 and 15 and is not described further herein. The connection 250 permits relative roll and pitch movements between the cold water pipe and the pipes and other elements of the platform, with the bellows containing pressure across the joint.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A flexible connection between a first fluid conveying member and a second member that are movable relative to each other in roll and pitch directions, comprising:
   an articulated connection that interconnects the first fluid conveying member and the second member, the articulated connection including a first portion fixed to the first fluid conveying member and a second portion fixed to the second member, and the articulated connection permits the first fluid conveying member and the second member to move relative to each other about roll and pitch axes that are perpendicular to one another and the roll and pitch axes are each perpendicular to a central longitudinal axis of the first fluid conveying member;
   a flexible, fluid impermeable bellows adjacent to the articulated connection, the flexible fluid impermeable bellows includes a first end fixed to the first fluid conveying member and a second end fixed to the second member;
   the flexible, fluid impermeable bellows comprising:
      a plurality of flexible ring segments;
      a plurality of steel channel ring segments that form radially outward facing channels;
      the plurality of flexible ring segments positioned in an alternating adjacent arrangement with the plurality of steel channel ring segments, at least some of the steel channel ring segments comprising individual steel channel ring segments that are coupled on a first side to a first flexible ring segment and on a second side to a second flexible ring segment;
      each flexible ring segment comprising a ring of elastomer having a pair of end flanges and a pair of intermediate flanges that are interconnected so as to define two radially inward facing valleys and a radially outward facing valley, and steel rings disposed in the radially inward facing valleys; and
      for each ring of elastomer, one of the end flanges thereof is disposed between one of the steel rings and one of the steel channel ring segments.

2. The flexible connection of claim 1, wherein the articulated connection comprises a gimbal joint.

3. The flexible connection of claim 2, wherein the gimbal joint includes a gimbal ring, first pins oppositely disposed on the gimbal ring, first bearings connected between the first pins and the first fluid conveying member, second pins oppositely disposed on the gimbal ring, and second bearings connected between the second pins and the second member; and
   the gimbal joint is axially spaced from the flexible, fluid impermeable bellows.

4. The flexible connection of claim 3, wherein the first pins extend radially inward from the gimbal ring, the second pins extend radially outward from the gimbal ring, and the first pins and the second pins are circumferentially spaced from each other by 90 degrees.

5. The flexible connection of claim 1, wherein the articulated connection comprises a plurality of tension cylinders that are circumferentially spaced from one another around the central longitudinal axis of the first fluid conveying member, each tension cylinder includes a first tension cylinder end fixed to the first fluid conveying member and a second tension cylinder end fixed to the second member; and
   the flexible, fluid impermeable bellows is surrounded by the plurality of tension cylinders.

6. The flexible connection of claim 5, wherein the tension cylinders are passive cylinders each of which comprise a cylinder, a piston disposed in the cylinder, and an elastomeric member disposed in the cylinder and engaged with the piston.

7. The flexible connection of claim 5, wherein the tension cylinders are hydraulic cylinders each of which comprises a cylinder and a piston disposed in the cylinder.

8. The flexible connection of claim 5, wherein the tension cylinders are disposed at an angle of at least 5 degrees relative to the central longitudinal axis.

9. The flexible connection of claim 1, further comprising a buoyant element disposed within the radially outward facing channels of the steel channel ring segments.

10. The flexible connection of claim 1, further comprising a flexible ring disposed at a root of the radially outward facing valley of each ring of elastomer.

11. The flexible connection of claim 1, wherein the first fluid conveying member comprises a pipe or a bundle of pipes.

12. The flexible connection of claim 11, wherein the first fluid conveying member comprises a pipe having a diameter of at least about 10 meters.

13. The flexible connection of claim 11, wherein the second member is a floating platform.

14. The flexible connection of claim 13, wherein the floating platform is part of an ocean thermal energy conversion plant.

15. A flexible connection that permits articulation between a first fluid conveying member and a second member that are movable relative to each other in roll and pitch directions, comprising:
- an articulated connection that interconnects the first fluid conveying member and the second member, the articulated connection including a first portion fixed to the first fluid conveying member and a second portion fixed to the second member;
- a flexible, fluid impermeable bellows adjacent to the articulated connection, the flexible fluid impermeable bellows includes a first end fixed to the first fluid conveying member and a second end fixed to the second member;
- the articulated connection comprises an articulated joint disposed along a central longitudinal axis of the first fluid conveying member, the articulated joint includes a first section fixed to the first fluid conveying member and a second section fixed to the second member, and the articulated joint is surrounded by the flexible, fluid impermeable bellows;
- the flexible, fluid impermeable bellows comprising:
  - a plurality of flexible ring segments;
  - a plurality of steel channel ring segments that form radially outward facing channels;
  - the plurality of flexible ring segments positioned in an alternating adjacent arrangement with the plurality of steel channel ring segments, at least some of the steel channel ring segments comprising individual steel channel ring segments that are coupled on a first side to a first flexible ring segment and on a second side to a second flexible ring segment;
  - each flexible ring segment comprising a ring of elastomer having a pair of end flanges and a pair of intermediate flanges that are interconnected so as to define two radially inward facing valleys and a radially outward facing valley, and steel rings disposed in the radially inward facing valleys; and
  - for each ring of elastomer, one of the end flanges thereof is disposed between one of the steel rings and one of the steel channel ring segments.

16. The flexible connection of claim 15, wherein the second member has a tapered shape with a first end fixed to the flexible, fluid impermeable bellows and a second end fixed to a support structure, and the second member tapers continuously from the first end fixed to the flexible, fluid impermeable bellows to the second end fixed to the support structure.

17. The flexible connection of claim 16, further comprising first load transfer beams extending between the first section of the articulated joint and an interior surface of the first fluid conveying member, and second load transfer beams extending between the second section of the articulated joint and an interior surface of the second member; the first load transfer beam and the second load transfer beam are generally planar with planes thereof oriented substantially parallel to the central longitudinal axis.

\* \* \* \* \*